United States Patent [19]

Gill

[11] Patent Number: 5,108,036

[45] Date of Patent: Apr. 28, 1992

[54] HAND-HELD EQUIPMENT

[75] Inventor: David C. Gill, Keynsham, United Kingdom

[73] Assignee: Nomix Manufacturing Company Limited, Bristol, United Kingdom

[21] Appl. No.: 479,974

[22] Filed: Feb. 14, 1990

[30] Foreign Application Priority Data

Feb. 14, 1989 [GB] United Kingdom ............... 8903243
Aug. 3, 1989 [GB] United Kingdom ............... 8917796

[51] Int. Cl.⁵ .............................................. B05B 9/00
[52] U.S. Cl. ................................. 239/525; 239/224; 248/364
[58] Field of Search ............... 56/12.7; 248/364; 172/611; 239/152, 525, 526, 532

[56] References Cited

U.S. PATENT DOCUMENTS

| 404,921 | 6/1889 | Miller | 42/97 |
|---|---|---|---|
| 3,618,245 | 11/1971 | Pruonto | 42/97 |
| 4,006,548 | 2/1977 | Vignini | 42/97 |
| 4,037,668 | 7/1977 | Svejda | 172/611 |
| 4,628,644 | 12/1986 | Somers | 239/378 |
| 4,772,057 | 9/1988 | Harvey | 294/49 |
| 4,901,975 | 2/1990 | Gill et al. | 239/224 |

FOREIGN PATENT DOCUMENTS

| 0300762 | 1/1989 | European Pat. Off. |
| 218423 | 7/1924 | United Kingdom . |
| 447638 | 5/1936 | United Kingdom . |
| 2197094 | 5/1988 | United Kingdom . |

Primary Examiner—Andres Kashnikow
Assistant Examiner—Christopher G. Trainor
Attorney, Agent, or Firm—Merchant & Gould

[57] ABSTRACT

Hand-held equipment, for example a herbicide applicator, comprises a handle member 24 and an operative portion 4 extending away from the handle member 24, the equipment further comprising a counterbalancing weight 22 which is releasably and/or displaceably attached to the handle member in such a position as to be capable of counterbalancing the weight of the operative portion. The equipment preferably is an applicator for agrochemicals.

14 Claims, 2 Drawing Sheets

HAND-HELD EQUIPMENT

This invention relates to hand-held equipment and is particularly, although not exclusively, concerned with hand-held equipment for distributing herbicides, pesticides or other agrochemicals.

Known hand-held applicators for herbicides comprise a handset including a handle member which is grasped by the operator, and a support member in the form of a tube, which is connected at one end to the handset and which carries, at the other end, a distribution head. In one particular form of such an applicator, the distribution head carries a spinning disc and an electric motor for rotating the disc, so that the herbicide is discharged from the disc as an array of droplets.

Equipment of this type can be used continuously for several hours without any need to stop to replenish the container of herbicide. However, the fact that the distribution head is supported at some distance from the handle member means that the equipment is not evenly balanced, and the operator has to exert some force on the handle member in order to hold the support member and distribution head in the correct orientation. Although the equipment as a whole can be relatively light in weight, the effort required to hold it in the correct orientation can be tiring when working for long periods.

According to the present invention, there is provided hand-held equipment comprising a handle member and an operative portion extending away from the handle member, the equipment further comprising a counterbalancing weight which is situated on the side of the handle member away from the operative portion, the counterbalancing weight being releasably and/or displaceably attached to the handle member.

In a preferred embodiment, the equipment is an applicator for agrochemicals, and the operative portion is a support tube carrying, at the end away from the handle member, a distribution head. The handle member may be provided on a handset which includes control elements for controlling the operation of the equipment.

The handset may be constructed as an integral housing, with the operative portion, and the counterbalancing weight situated opposite one another on the housing, with the handle member between them.

The handset may have a recess within which the counterbalancing weight is at least partially accommodated. The weight may be attached to the handset by releasable securing means. For example, if the weight is situated in a recess, the releasable securing means may comprise screws passing through walls of the recess at opposite sides of the handset, into opposite faces of the weight.

The counterbalancing weight may comprise dense material, such as lead or an alloy of lead, encased in plastics material. The casing may comprise two casing parts which are a snap fit together, for example by projecting portions of the casing parts which engage one another in through holes provided in the dense material.

The equipment may be provided with a battery constituting a source of electrical power, for example for the motor in the distribution head. In one embodiment in accordance with the present invention, the battery itself serves as the counterbalancing weight. Thus the battery is displacably situated relatively to the handle member so that, in the operative orientation of the equipment, the centre of gravity of the battery is disposed on the side of the handle member opposite the operative portion the weight of the distribution head and of the support tube.

The operative portion may be readily releasable from the handle member so that one operative portion can be replaced by another. For example, where the equipment comprises a herbicide applicator, different lengths of support tube may be desirable for different purposes. It will be appreciated that the use of a longer support tube will require more counterbalancing than a shorter support tube. By attaching the counterbalancing weight, in accordance with one embodiment, in a readily releasable manner to the handle member, it is possible to replace one weight by another to provide a desired counterbalancing effect.

In an alternative embodiment, the counterbalancing weight (and/or the battery) is attached to the handle member in such a way that it is movable relatively to the handle member. For example, the counterbalancing weight may be mounted on a screw mechanism so that the moment applied by the counterbalancing weight at the handle member can be adjusted. Thus, instead of replacing the counterbalancing weight if a different operative movement is used, the position of the counterweight can be adjusted instead. Also, adjustment of the counterweight enables fine tuning of the balance of the equipment to be made.

For a better understanding of the present invention, and to show how it may be carried into effect, reference will now be made, by way of example, to the accompanying drawings, in which:

FIG. 3 is a sectional view of a counterbalancing weight of the handset of FIG. 2.

Figure 1:
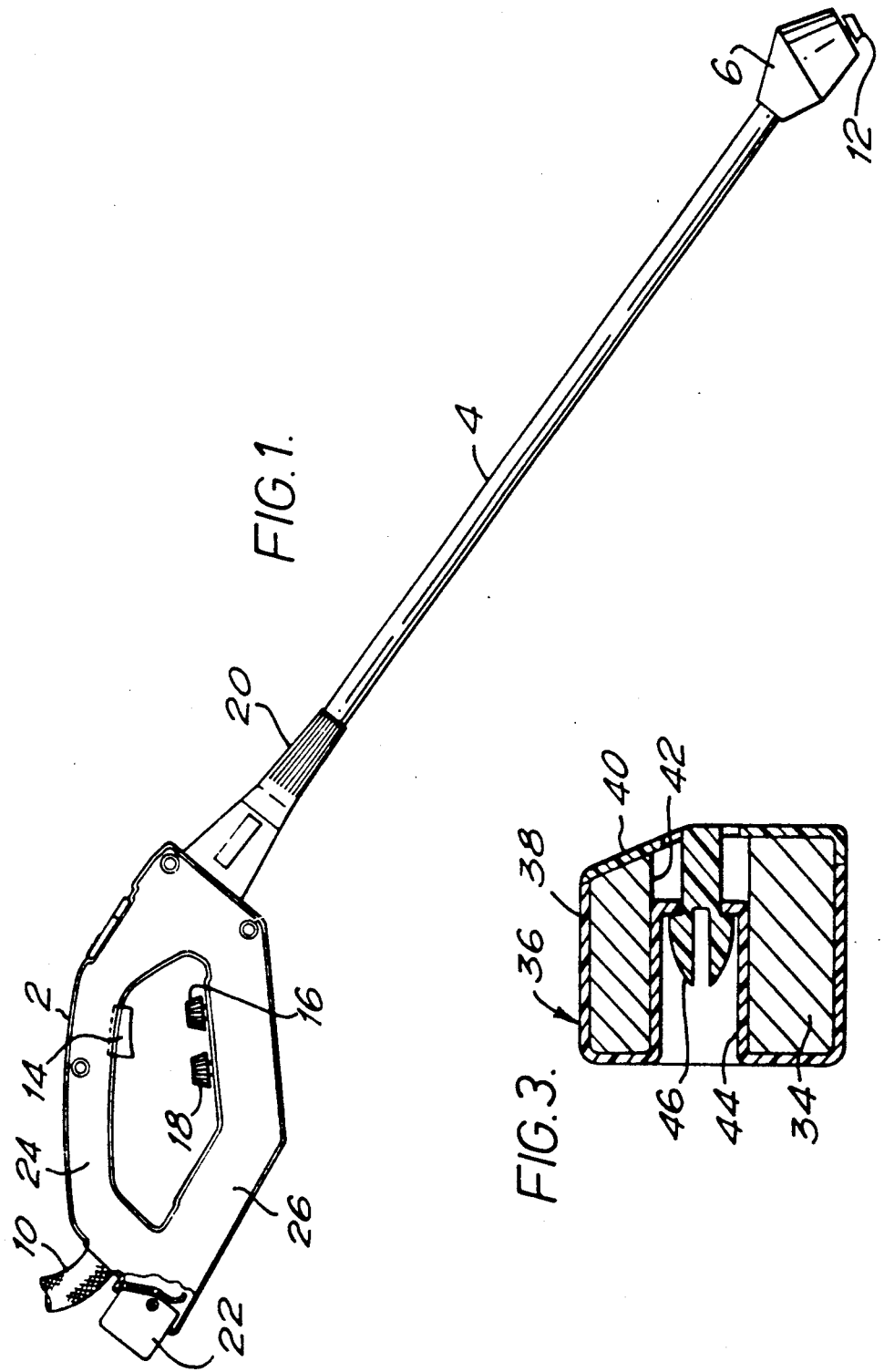
FIG. 1 shows a spinning disc herbicide applicator.

The applicator shown in FIG. 1 comprises a handset 2 to which is connected, by a support tube 4, a distribution head 6. The handset 2 is provided with a flexible tube 10 which leads to a container of herbicide. The flexible tube 10 is connected, by a valve in the handset 2, to a further flexible tube which extends down the support tube 4 to a spinning disc 12 on the distribution head 6.

The handset 2 accommodates control circuitry for controlling a motor accommodated within the distribution head 6 for driving the disc 12. The handset 2 also accommodates a battery for supplying electrical power to the motor in the distribution head 6. For this purpose, the battery is connected to the motor, via the control circuitry, by electrical leads extending through the support tube 4.

A trigger 14 is provided on a handle member 24 of the handset 2 and serves the dual function of opening a valve in the fluid supply line to the head 6 and of closing a switch to provide power to the motor. The motor speed can be adjusted by means of a control knob 16. A further control knob 18 controls the generation of a regular audible tone to assist the operator to maintain a predetermined walking speed, and to operate the equipment during a test cycle to calibrate the flow rate of herbicide.

The support tube 4 is connected to the handset 2 by an adaptor 20. The connection between the support tube 4 and the handset 2 is the same as that disclosed in our copending British Patent Application No. 8822078.5, and permits easy disconnection of the support tube 4 from the handset 2, including disconnection of the fluid supply line and of the electrical leads in a single operation. Consequently, it is a simple matter to exchange one support tube 4 and distribution head 6 with another. This is necessary not only if the support tube or distribution head become damaged, but if, for example, a support tube of different length or configuration is required for a specific application.

In order to counterbalance the weight of the support tube 4 and distribution head 6, a counterweight 22 is provided at the opposite end of the handset 2 from the support tube 4. Thus, as can be appreciated from FIG. 1, an operator grasping the handle member 24 of the handset 2 will have the weight of the support 4 and the distribution head 6 counterbalanced not only by the counterweight 22, but also by the weight of the battery, which may be accommodated in the adjacent portion 26 of the handset 2.

Figure 2:
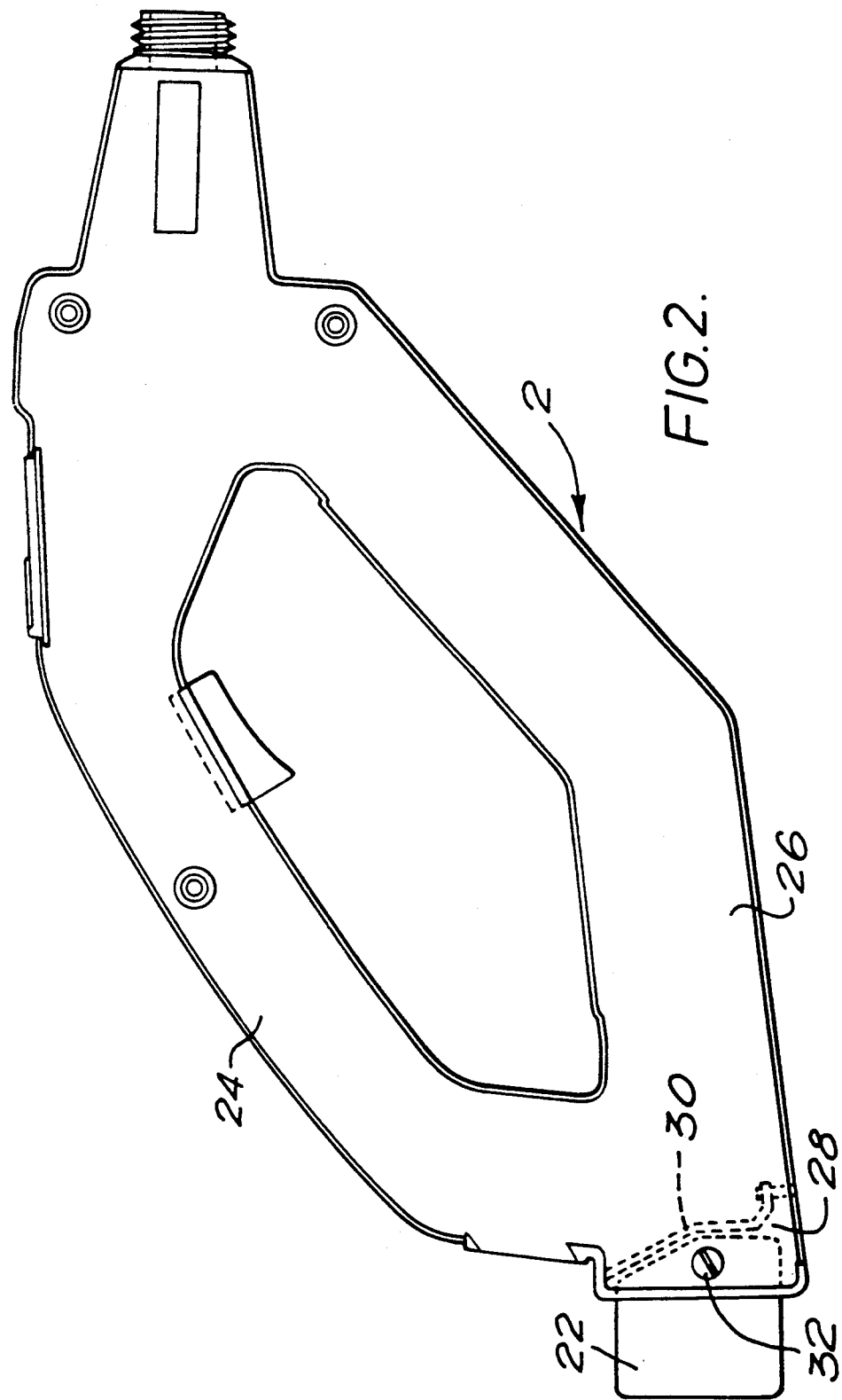
FIG. 2 shows the handset of the applicator of FIG. 1.

Referring to FIG. 2, the counterweight 22 is accommodated partially in a recess 28, bounded by an inner wall 30. The counterweight 22 is secured in position by two screws 32 disposed on opposite sides of the casing 2. The screws 32 extend through the wall of the casing into opposite end spaces of the counterweight 22.

The counterweight 22 is shown in more detail in FIG. 3. It comprises a body 34 of lead or lead alloy enclosed in a plastics casing 36. The casing 36 is made up of two parts 38 and 40. The body 34 has one or more through holes 42, into which extend cooperating projections 44 and 46 of the parts 38 and 40 respectively of the casing 36. The parts 44 and 46 cooperate to retain the two parts 38 and 40 of the casing 36 together.

By releasing the screws 32, the counterweight 22 can be removed and replaced by another of different weight. Thus, the counterbalancing effect can be adapted to the moment applied by support tube 4 and the distribution head 6.

In an alternative embodiment, the counterweight 22 may be mounted movably on the handset 2. Thus, for example, it could be extended or retracted in the direction to the left or right from the position shown in FIG. 2, so altering the moment arm about the handle member 24.

By the expedient of the exchangeable or displaceable counterweight 22, the equipment can readily be adapted to suit the preferences of the user, even if the support tube and distribution head 6 are exchanged.

I claim:

1. A hand-held applicator for agrochemicals, comprising a handle member and a support tube extending away from the handle member and carrying, at the end away from the handle member a distribution head, the application further comprising a counterbalancing weight which is situated on the side of the handle member away from the support tube to counterbalance the weight of the support tube and the distribution head, the counterbalancing weight being releasably attached to the handle member.

2. Equipment according to claim 1, wherein the counterbalancing weight comprises a dense material, such as lead or an alloy of lead, encased in a casing of plastics material.

3. Equipment according to claim 2, wherein the casing comprises two casing parts which have projecting portions extending through holes provided in the dense material.

4. Equipment according to claim 1, wherein the handle member is provided on a handset having a recess within which the counterbalancing weight is at least partially accommodated.

5. Equipment according to claim 4, wherein the counterbalancing weight is releasably attached to the handle member by screws passing through walls of the recess at opposite sides of the handset, into opposite faces of the counterbalancing weight.

6. Equipment according to claim 1, wherein the counterbalancing weight is in the form of a battery used in the equipment as a source of electric power.

7. A hand-held applicator for agrochemicals, comprising a handle member and a support tube extending away from the handle member and carrying, at the end away from the handle member, a distribution head which includes an electric motor, the applicator further comprising a battery providing a source of electrical power for the electric motor, the center of gravity of the battery being situated on the side of the handle member away from the support tube to counterbalance the weight of the support tube and the distribution head, the battery being displaceably attached to the handle member so that the moment applied by the battery at the handle member can be adjusted.

8. A hand-held applicator for agrochemicals, comprising a handle member and a support tube extending away from the handle member and carrying, at the end away from the handle member a distribution head, the applicator further comprising a counterbalancing weight which is situated on the side of the handle member away from the support tube to counterbalance the weight of the support tube and the distribution head, the counterbalancing weight being displacably attached to the handle member.

9. Equipment according to claim 8, wherein the counterbalancing weight comprises a dense material, such as lead or an alloy of lead, encased in a casing of plastics material.

10. Equipment according to claim 9, wherein the casing comprises two casing parts which have projecting portions extending through holes provided in the dense material.

11. Equipment according to claim 8, wherein the handle member is provided on a handset having a recess within which the counterbalancing weight is at least partially accommodated.

12. Equipment according to claim 8, wherein the counterbalancing weight is attached to the handle member in such a way that it is movable relative to the handle member.

13. Equipment according to claim 12, wherein the counterbalancing weight is in the form of a battery used in the equipment as a source of electric power.

14. Equipment according to claim 13, wherein the counterbalancing weight is mounted on a screw mechanism so that the momentum applied by the counterbalancing weight at the handle member can be adjusted.

* * * * *